March 5, 1968  L. A. MUIRHEAD ETAL  3,372,215
PRODUCTION OF EXPANDABLE POLYMER PARTICLES
Filed March 16, 1966  2 Sheets-Sheet 1
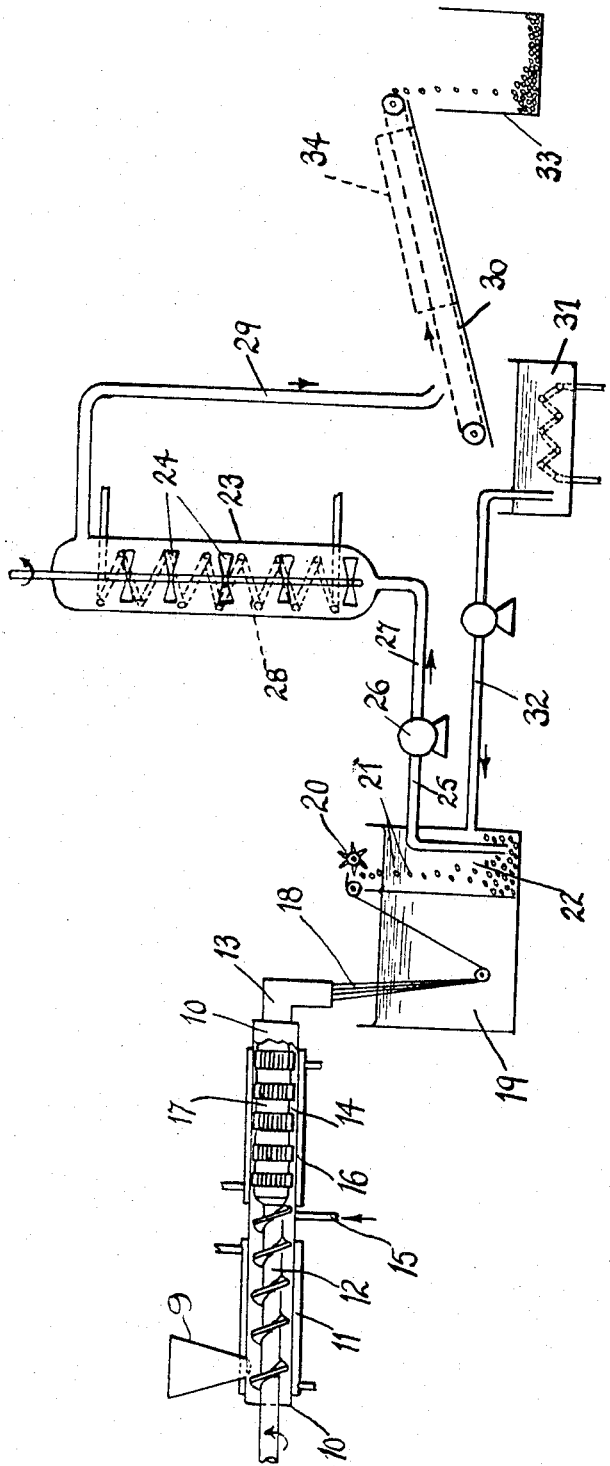
FIG. I
INVENTORS:
LESLIE A. MUIRHEAD
EDWARD L. HILL
BRIAN W. FORSTER
BY: *Martin S. Baer*
THEIR ATTORNEY

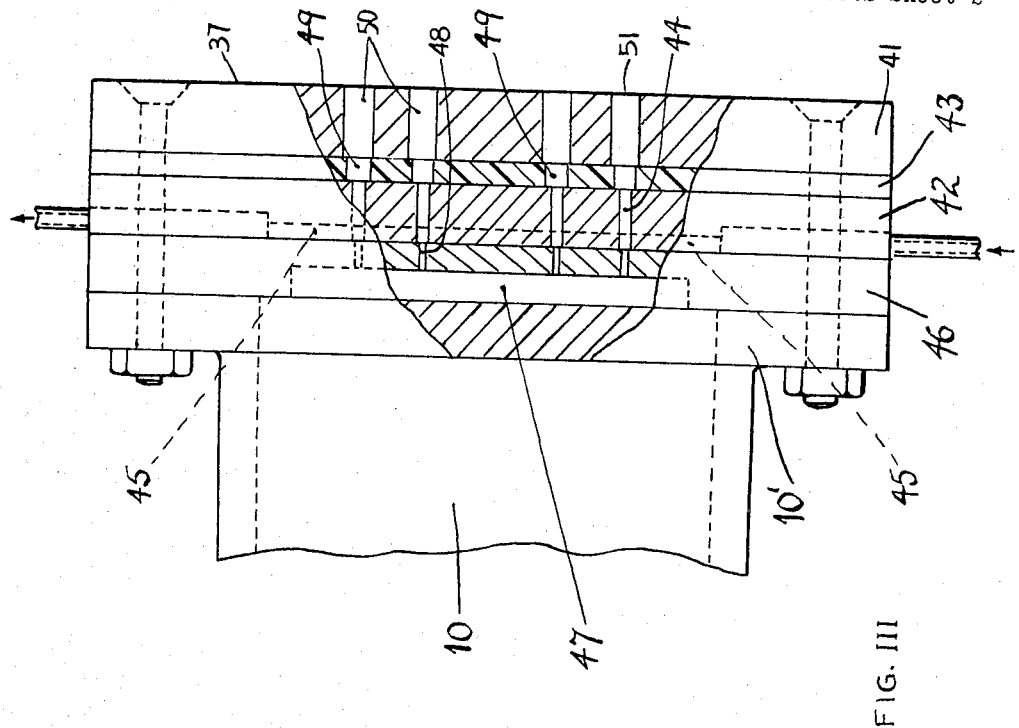
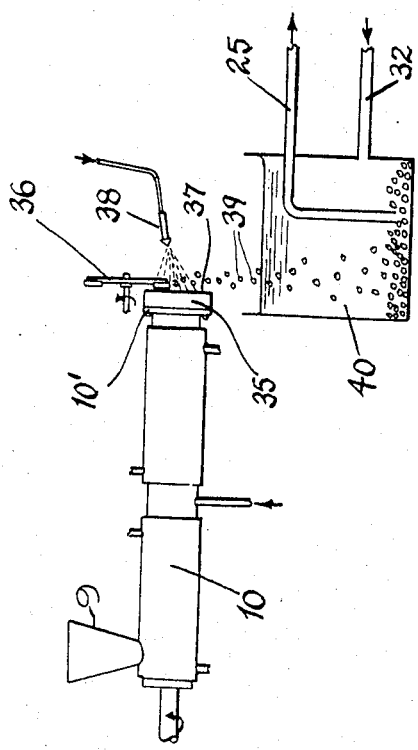

United States Patent Office 3,372,215
Patented Mar. 5, 1968

3,372,215
PRODUCTION OF EXPANDABLE POLYMER PARTICLES
Leslie A. Muirhead and Edward L. Hill, Wilmslow, and Brian W. Forster, Lymm, England, assignors to Shell Oil Company, New York, N.Y., a corporation of Delaware
Filed Mar. 16, 1966, Ser. No. 534,829
Claims priority, application Great Britain, Mar. 17, 1965, 11,311/65
8 Claims. (Cl. 264—53)

ABSTRACT OF THE DISCLOSURE

In the manufacture of expandable thermoplastic particles, such as polystyrene particles containing a vaporizable blowing agent, the vaporizable mass is extruded in filamentary form as an unexpanded extrudate, immediately cooled by contact with a fluid to a temperature not below 60° C., and maintained at that temperature for a normalizing period of time sufficient to result in a product which, upon later unconfined expansion, results in expanded particles in which 90% of the cells have a cell diameter not greater than 100 microns.

---

The present invention is concerned with the manufacture of expandable particles of thermoplastic organic polymers, such as polystyrene, the term polymer including a polymer composition; with the resulting expandable particles; and with the manufacture of an expanded (i.e., a foamed) polymer of cellular form, including shaped articles, therefrom.

It is known that a thermoplastic organic polymer such as polystyrene can be expanded to a cellular form by intimately incorporating a vaporizable expanding agent in the polymer and then heating the polymer under conditions permitting the expanding agent to vaporize to form a large number of individual, enclosed spaces or cells within the polymer. In the case of polystyrene it is common to use as the vaporizable expanding agent a normally-liquid, vaporizable organic substance, such for example as technical pentane, which when intimately incorporated in the polymer forms an "expandable polymer." On heating such an expandable polymer, the expanding agent vaporizes in a large number of individual locations within the polymer to form said cells. On cooling, the resulting polymer is of cellular form: such a polymer is referred to herein as an "expanded polymer."

It is also known to manufacture shaped, cellular articles from polymers in the form of expandable polymer particles. The expandable polymer particles are normally "pre-expanded," that is they are heated to effect at least a major part of the expansion of which they are capable. Articles are formed from such particles in a closed, heated mold of appropriate shape. Formation of shaped cellular articles is thus effected by the fusion together of pre-expanded particles in the mold with only a minor amount of further expansion occurring therein. An early description of such technique occurs in U.S. Patent 2,744,291 to Stastny et al. To avoid the necessity for transporting the bulky pre-expanded particles from the manufacturer to the user, pre-expansion is usually carried out by the user, i.e., the manufacturer of shaped cellular polymer articles, and such pre-expansion is usually effected by contacting the expandable polymer particles with live steam.

For many years, expandable polystyrene particles have been manufactured by incorporating a vaporizable expanding agent in polystyrene beads obtained by a suspension polymerization process. More recently it has also been proposed to incorporate such an expanding agent in heat-plastified polystyrene in an extruder and to form expandable particles by cutting the expandable, filamentary extrudate. Since such an extrudate is an expandable material at an elevated temperature, the prior proposals have included special steps designed to prevent any substantial premature expansion of the extrudate, such steps comprising immediately contacting the extrudate with a liquid coolant such as water to cool the extrudate to a temperature below 50° C., or extruding the expandable polymer into a pressure zone in which the extrudate remains until it has been cooled to a temperature at which it is incapable of expanding to any significant extent. The use of a pressure zone brings with it operational complications, particularly when the extrudate is chopped into particles within the pressure zone; while sudden cooling of the extrudate to below 50° C. is said to "freeze" the polymer in an oriented or strained condition and in such case a subsequent annealing operation involving heat treatment at a temperature between 50 and 75° C. has been proposed as a means of relaxing the orientation or strain existing within the expandable polymer particles.

According to the present invention, a process for the manufacture of expandable particles of a thermoplastic organic polymer comprises incorporating a vaporizable expanding agent in a heat-plastified mass of said polymer, extruding heat-plastified polymer containing said expanding agent in filamentary form into an atmospheric or substantially atmospheric pressure environment and immediately cooling the extruded polymer by contact with a fluid at a temperature between 60 and 80° C. under conditions such that the temperature of the extruded polymer does not fall below 60° C. during a normalizing period (as herein defined) immediately following extrusion thereof, cutting the extruded polymer into particles and thereafter cooling the polymer particles to ambient temperature. Preferably the extruded polymer is cut into particles and the resulting particles are subjected to normalizing conditions prior to cooling, although it is also possible to normalize the polymer in filamentary form prior to cutting and cooling to ambient temperature.

The present invention also includes the resulting particulate expandable polymer i.e., expandable particles of a thermoplastic organic polymer; and expanded particles and shaped articles formed therefrom by any known or suitable expansion technique or molding process.

Said "normalizing period" is defined herein as the minimum length of time for which an extruded expandable polymer in filamentary or particulate form must be maintained at a temperature within the range 60 to 80° C. and at normal pressure prior to being cooled to ambient temperature in order that the diameter of at least 90% of the cells of an expanded particle, obtained by freely expanding such an expandable particle or an expandable particle cut from such expandable filamentary polymer by heating under conditions resulting in a maximum increase in volume of the particle, is not greater than 100 microns. Accordingly, the term "normalize" herein means the step of maintaining an extruded expandable polymer in filamentary or particulate form at a temperature within the range from 60–80° C. and at normal pressure, prior to being cooled to ambient temperature, for a sufficient length of time so that, upon subsequently freely expanding such an expandable particle or an expandable particle cut from such expandable filamentary polymer by heating under conditions resulting in a maximum increase in volume of the particle, the diameter of at least 90% of the cells of the particle will not exceed 100 microns. In general, a cell size of about 100 microns is the maximum cell size currently acceptable commercially in the manufacture of cellular polystyrene articles by molding expanded polystyrene particles.

The process of the present invention has the operational advantage of producing normalized expandable polymer particles which do not require any subsequent annealing operation. Since the temperature of the extruded polymer is not allowed to fall below 60° C. until normalization has been achieved the intermediate stage is avoided in which, according to the teaching of the prior art, orientation or strain is produced. It has been found that operation in accordance with the present invention permits the attainment of expandable polystyrene particles which, from the point of view of their end-use behavior in a subsequent molding operation leading to shaped cellular polystyrene articles, closely resemble the well-known expandable polystyrene particles obtained by incorporating an expanding agent in the particulate product of a suspension polymerization process.

One of the major difficulties which can arise in the manufacture of expandable polymer particles by methods involving incorporating a vaporizable expanding agent in the heat-plastified polymer is the problem of cell size in the resulting expanded polymer. Whatever the mechanism of the normalizing treatment of the present invention may be, it has been found that operation in accordance with the present invention enables a satisfactory cell size (i.e., 90% below 100 microns) to be attained in the ultimate cellular polymer.

In carrying out the present invention it is essential to normalize the extruded expandable polymer either as particles or in filamentary form prior to cutting into particles. The extrudate comprising a thermoplastic organic polymer such as polystyrene in a heat-plastified form and containing a vaporizable expanding agent dispersed therein, can be cooled to and normalized at 60–80° C. while in the form of a filament (or a plurality of filaments). Such a normalized filament can then be cut into particles while said filament is at 60–80° C., or after first cooling to ambient temperature. Preferably said filamentary extrudate is cut into particles immediately following extrusion thereof, by cutting the extrudate at the extrusion orifice of the extruder (face-cutting) or shortly after extrusion so that the extruded expandable polymer is normalized in particulate form. Operation in this preferred manner has practical advantages as compared to normalization in filamentary form. When employing the preferred technique the extruded filament is immediately contacted, in an atmospheric or substantially atmospheric pressure environment, with a fluid at a temperature between 60 and 80° C. Simultaneously, or within a short time of extrusion, the extruded filament is cut into particles and the resulting particles are contacted with a fluid at a temperature between 60 and 80° C. under conditions such that the temperature of both said extruded filament and the resulting particles does not fall below 60° C. during the required normalizing period immediately following extrusion.

The extruded filament can be cooled by contact with a liquid or gas at a temperature of 60–80° C., but preferably with a liquid, e.g., water. When face-cutting is employed, the liquid is preferably in droplet form, the expandable polymer being sprayed therewith as it is being extruded. When the filamentary extrudate is cut into particles subsequent to cooling with a liquid at 60–80° C., the extrudate can be passed immediately into a body of such liquid disposed as near as possible to each extrusion orifice and, if desired, the extrudate can also be sprayed with liquid prior to entering the body of liquid. The normalizing of the extruded filament or particles cut therefrom is conveniently achieved by contacting said filament or particles with a body of cooling liquid at 60–80° C., which is preferably water. Cooling of the normalized filaments or particles to ambient temperature is conveniently achieved by contacting said filaments or particles with air and this can be a combined cooling and drying operation to remove liquid, e.g., water, physically associated therewith.

While the temperature of the heat-plastified polymer as it is being extruded (i.e., its extrusion temperature at the die-head) will depend, i.a., on the softening temperature of the polymer composition (which may be lower than that of the polymer itself due to the presence therein of the vaporizable expanding agent), the extrusion temperature should always be high enough to avoid the possibility of solidification of the polymer in the extrusion orifices of the die-head. The required extrusion temperature will usually depend on the dimensions, and in particular the cross-sectional area, of the extrusion orifice, and on the extent to which the die-head itself is cooled by the cooling fluid at 60–80° C. with which the extrudate is contacted, particularly when using a face-cutting technique. For example, for polystyrene containing 4 to 80% by weight of technical pentane as the expanding agent, the extrusion temperature of the heat-plastified polymer can be as low as between 105° and 115° C., e.g., about 110° C., if the extrusion orifices are of the order of 2 to 3 millimeters in diameter and if there is no significant heat loss from the heat-plastified polystyrene in the die-head. Higher temperatures should be employed when the extrusion orifices have smaller diameters. In general, extrusion temperatures for polystyrene containing technical pentane can be up to 150° to 160° C., depending on the extrusion conditions employed. Temperatures of 130° to 160° C. are advantageous when using small diameter extrusion orifices, i.e., below 1.0 millimeter, e.g., of the order of 0.5 to 0.75 millimeter.

Normalizing can be carried out by contacting the extrudate with said fluid at a temperature between 60 and 80° C., e.g., about 70° C., typically for a period between 30 and 60 minutes for expandable polystyrene particles, depending on the physical form, e.g., the particle size, of the extrudate. Suitable normalizing liquids are, for example, water or brine or other aqueous media, e.g., mixtures of water and glycerol or ethylene glycol. When the extrudate is normalized in particulate form, the particles are subsequently separated from the normalizing liquid in any convenient manner, e.g., by employing a screen which can be an inclined, a vibratable screen or a perforated travelling belt. When a normalizing liquid such as water is used, the particles are thereafter dried and cooled to ambient temperature, e.g., in a current of air.

It will be understood that a plurality, e.g., between 20 and 50, of filaments of expandable polymer will usually be extruded simultaneously, using a multi-orifice die-head, when carrying out the present invention on a manufacturing scale. It is usual to employ circular extrusion orifices with the result that the filamentary extrudate is of essentially circular cross-section. While such a filament is of rod-like form it is usual in the art to refer to it as a strand, and the term "strand" is used in this general sense in this specification.

Circular extrusion orifices generally have diameters in the range from 0.5 to 3 millimeters. Non-circular orifices have corresponding areas.

Suitable thermoplastic polymers are polystyrene or other polyvinyl-aromatic compounds and/or polyvinylidene-aromatic compounds, or a copolymer of a vinyl-aromatic compound and/or vinylidene-aromatic compound, e.g., with acrylonitrile, methyl methacrylate, acrylic acid or methacrylic acid. Such polymers are further enumerated in U.S. 3,224,984 to Roper et al., in the passage from column 4, line 64 to column 5, line 16. However, the present invention is particularly applicable to polystyrene.

Said vaporizable expanding agent can be a normally liquid organic substance which has substantially no solvent action on said thermoplastic polymer, or a mixture of such organic substances. If desired, such a substance or mixture thereof can be used together with a small amount of a solvent for said polymer. Preferably said expanding agent is an organic liquid boiling, at normal pressure, between about 10° and about 90° C. and usually between about 25° and about 80° C. Generally preferred are saturated aliphatic hydrocarbons or mixtures thereof such, for example, as n-pentane or technical pentane or a mixture of n-pentane and iso-pentane containing between 25 and 80% by weight of iso-pentane. Butanes, particularly n-butane are also suitable, as are petroleum ethers, hexane, and cyclopentane. Fluorochlorocarbons are also known as expanding agents for polystyrene, e.g., $CCl_2F$—$CClF_2$, which boils at about 48° C.

If desired, said polymer can contain an additive, e.g., a low molecular weight polyethylene wax, advantageously in an amount which is between 0.05 and 0.1% by weight of the polymer, as referred to in the specification of U.S. Patent No. 3,224,984 to Roper et al.

The process of the present invention can be carried out either by cutting the expandable polymer as it is extruded from the die orifices using any known or suitable face-cutting technique, or by extruding the polymer in strand form and subsequently chopping or cutting the strands into particles using any known or suitable strand-cutting technique. In each case the expandable polymer is immediately contacted with cooling fluid at 60 to 80° C., either as it issues from the die orifices as when face-cutting, or as soon as practicable thereafter when a strand cutting technique is employed. When strand-cutting is used, it is preferable to carry out the cutting operation no later than during the initial stage of the normalizing period, and preferably prior to said initial stage, in order to avoid handling long strands. The degree of drawdown of the extruded strands is preferably kept as small as possible to reduce the risk of strand breakage. In general the degree of drawdown should not exceed that which will normally occur in a strand-cutting operation employing the minimum haul-off tension in the strands. When employing the strand-cutting technique it is usually unnecessary to direct cooling fluid against the face of the die-head, providing the extruded strands are substantially immediately contacted with said cooling fluid so as to reduce the temperature of at least the surfaces of the strands to the normalizing temperature of 60 to 80° C. as quickly as possible. However, it is possible to direct cooling fluid, e.g., a spray of liquid droplets, against the face of the die-head if desired; operation in this way is recommended if the extrudate tends to expand prematurely prior to the entering for example a body of cooling liquid at 60 to 80° C. disposed adjacent the die-head. In general, however, when using water at 60 to 80° C. as the cooling fluid, no cooling of the die-head itself will occur when employing a strand-cutting technique, whereas when employing a face-cutting technique it has been found advisable to ensure that the cutting face is kept "wetted" with a cooling liquid in order to prevent smearing of the polymer on the cutting face, which impairs the face-cutting operation. The removal of heat from the die-head as the result of cooling liquid contacting the die face could cause premature solidification of polymer in the die-head. However, this can be prevented in several ways including, for example, supplying heat to the die-head itself by providing it with an electrical heating element or a passage for the circulation therethrough of a heating uid, e.g., steam, preferably together with the provision of thermal insulation between the die face and the body of the die-head as will be described later in detail in connection with the use of face-cutting technique in carrying out the present invention. Alternatively or in addition one can operate at higher extrusion temperatures, e.g., for polystyrene between 130 and 160° C., providing of course the extrusion temperature is not so high as to cause undesirable expansion of the expandable polymer as it issues from the die-head. While such measures are considered to be more important in the case of face-cutting it is to be understood that the relationship between polymer solidification and extrusion orifice dimensions referred to previously can render such measures applicable to strand cutting as well.

Whether face-cutting or strand-cutting techniques are employed, the vaporizable expanding agent is incorporated in the polymer in a screw extruder comprising a barrel providing a heat-plastifying section followed by a dispersion section to which the expanding agent is supplied and in which it is incorporated in the heat-plastified polymer fed by the extruder screw from the first section. Heat is supplied to the polymer in the first section, e.g., electrically or by means of a heat-transfer fluid circulated through a jacket surrounding the first section; and usually heat is removed from the polymer in the second section by means of a heat-transfer fluid, e.g., water circulated through a jacket surrounding the second section. The extruder screw extends through the length of both sections of the extruder and is profiled to provide for agitation and forward feeding of the polymer in the first section and the exertion of extrusion pressure thereon; and for mixing of the heat-plastified polymer and the expanding agent in the second section. The second section is followed by the die-head through which the expandable polymer formed in the second section is extruded under pressure exerted on the polymer in the first section, the degree of heat removal in the second section being controlled in accordance with the desired extrusion temperature.

The invention will be further described by reference to the drawing, wherein:

FIGURE I is a diagrammatic illustration of apparatus suitable for practicing this invention with employment of the strand-cutting technique;

FIGURE II is a diagrammatic illustration of apparatus suitable for practicing this invention with employment of the face-cutting technique; and FIGURE III is an elevation, partially in section, of details of the extruder head employed in the method illustrated in FIGURE II.

A convenient way of carrying out the present invention while employing a strand cutting technique for manufacturing, e.g., expandable polystyrene particles, is illustrated diagrammatically in FIGURE I of the accompanying drawings. Referring to FIGURE I, polystyrene granules are fed through hopper 9 to a screw extruder 10 having a heating jacket 11 extending over part of its length, in which the extruder screw 12 is of conventional profile for heat-plastifying the polystyrene and advancing the heat-plastified polymer under extrusion pressure towards the extruder die-head 13. The remaining part 14 of extruder 10 constitutes a dispersion section in which technical pentane, supplied through a line 15, is incorporated in the heat-plastified polystyrene. A cooling jacket 16 surrounds the dispersion section and that part 17 of the extruder screw lying within the dispersion section is shaped to provide the agitation required to effect an intimate dispersion of the pentane in the polystyrene. The pentane-containing polystyrene is extruded as strands 18 from the die-head 14 (four such strands being shown) and these strands 18 are immediately led into a bath 19 containing water at between 60° C. and 80° C. to effect cooling of at least the skin of the strands 18 to the temperature of the water before cutting the strands ino particles using a conventional strand cutter 20. The resulting particles 21 fall into a slurry tank 22 which also contains water at between 60° C. and 80° C. and which constitutes a reservoir for the subsequent normalizing stage which is carried out in a tower 23 comprising an internal agitator 24 shaped in such a manner as to progressively lift up through the tower 23 the particles supplied from slurry tank 22 to the base of the tower as an aqueous slurry or suspension via a line 25, a pump 26 and a line 27. Tower 23 also contains an internal heating coil 28 for maintaining the water in the tower 23 at a temperature between 60 and 80° C. The size of tower 23 in relation to the average residence time of particles 21 in slurry tank 22 and to the particle throughput rate in tower 23 is such that the particles formed by cutter 20 are subjected to the required normalization, i.e., the particles are maintained at a temperature between 60 and 80° C. for a normalizing period, e.g., 40 minutes, prior to discharge from the top of tower 23. The normalized particles are discharged from tower 23 through a line 29 onto the lower end of a conveyor 30 having a perforated belt which permits water to drain from the particles into a reservoir 31 in which the water is heated for return via a line 32 to slurry tank 22. The particles 21 are conveyed to a bin 33, if desired via an air dryer shown in dotted lines at 34.

In the alternative way of carrying out the process of the present invention, in which the extruded polymer containing a vaporizable, normally-liquid expanding agent, e.g., technical pentane, is extruded and face-cut at the die-head, the face-cutting is preferably effected by means of a rotatable cutter while the face of the die-head is simultaneously contacted with droplets of water at a temperature of 60 to 80° C. sprayed onto said face. The water droplets at this temperature are conveniently formed by spraying wet steam towards the face of the die-head. The resulting particles of expanded polymer are washed by the water spray into a body of water maintained at a temperature of 60 to 80° C., e.g., about 70° C., in which the particles remain for the desired normalizing period, typically 30 to 60 minutes. The die-head is provided with means for counteracting the heat loss which occurs as the result of the water spray on the die face. A preferred way of achieving this is to employ a die-head of sandwich construction which comprises a front plate constituting the die face against which the cutter rotates, a back plate which is secured to the extrusion end of the extruder, and an insulating plate between the front and back plates, to provide thermal insulation between the die face and the extruder. The back plate preferably also functions as a heating plate, for which purpose it is preferably provided with a passage or passages for the circulation of a heating fluid. Alternatively the back plate can embody or be surrounded by an electrical heater, but heating by means of a circulating heating fluid is preferred. If desired, a separate heating plate can be provided between the back plate and the insulating plate. Each plate of the die-head is provided with feed channels, which are in alignment when the plates are assembled together, through which the heat plastified polymer is extruded. It has been found that any tendency for the heat-plastified polymer to solidify prematurely in these feed channels with resulting impairment of the extrusion operation or even total blockage of the feed channels can be overcome in some circumstances (depending for example on the size of the feed channels and the extrusion temperature employed) by enlarging the diameter (or cross-sectional area) of the feed channels in the front plate constituting the die-face, or at least the extrusion orifice portions of such feed channels. For example the diameter of the extrusion orifices can be at least 20% greater than that of the feed channels in the back plate and insulating plate.

A convenient way of carrying out the present invention employing a face-cutting technique for manufacturing, e.g., expandable polystyrene particles is illustrated in FIGURE II of the accompanying drawings. Referring to FIGURE II, polystyrene granules are fed to the hoppers of an extruder 10 which is of the same kind as that described with reference to FIGURE I except for the die-head 35, which is of a sandwich construction as shown on an enlarged scale in III of the accompanying drawings and will be described in detail later with reference thereto. Pentane-containing polystyrene is extruded from the die-head and immediately face-cut by a two-armed cutter 36 bearing against face 37 of die 35, while being cooled simultaneously to a temperature between 60° C. and 80° C. by water droplets sprayed against die-face 37 from a nozzle 38 supplied with wet steam which condenses to form the water droplets in the vicinity of the die face 37. The resulting particles 39 are carried by the water droplets into a slurry tank 40 containing expandable polystyrene particles in suspension in water at 60 to 80° C. A slurry of particles in water at this temperature is continuously pumped from tank 40 to the base of a normalizing tower 23 as described with reference to FIGURE I. The normalized particles are removed from the top of normalizing tower 23 and passed via a conveyor 30 to a storage bin 33, the arrangement following tank 40 being similar to that shown in FIGURE I to which reference is made in this respect.

The die-head shown in FIGURE III, which is the preferred form of die-head for use in the present invention when face-cutting is used, comprises a body of sandwich construction mounted at the extrusion end of the extruder. The die-head body comprises, in combination, steel front and back plates 41 and 42, with an insulating plate 43 made of cellulose-filled phenol formaldehyde resin disposed between the front and back plates 41 and 42 to provide thermal insulation between front plate 41, which provides the face portion 37 of the die-head, and extruder 10. Back plate 42, which is mounted on a flanged portion 10' of the output end of extruder 10, is provided with a plurality of feed channels 44 for the heat-plastified polymer. Back plate 42 is also provided with a milled channel 45 on its outer face which, when the die-head is assembled and mounted on extruder 10 with a plate 46 interposed between back plate 42 and flanged portion 10' of the extruder, provides a passage through which steam under pressure is passed to maintain the heating plate at about 100° to 130° C., depending on requirements. Plate 46, in addition to closing channel 45, also provides transverse feed channels 47 in communication through orifices 48 with feed channels 44 in the back plate 42. Insulating plate 43 has a similar plurality of feed channels 49, each somewhat larger in diameter than feed channels 44 in back plate 42, and leading to a similar number of feed channels 50 in front plate 41, feed channels 50 being somewhat larger in diameter than feed channels 49 in the insulating plate 43 and forming at their open ends 51 the extrusion orifices of the die-head.

The present invention is illustrated by the following examples:

*Example I*

Expandable polystyrene particles were manufactured by a strand-cutting method as described above with reference to FIGURE I, the polystyrene being rendered expandable by the incorporation therein of technical pentane in a 60 millimeter screw diameter extruder. The extruder comprised a heat-plastifying section in which the polystyrene, supplied as granules to the feed hopper of the extruder, was heated to 200° C.; and a pentane-injection section maintained at 150° C. to which liquid pentane was supplied and homogeneously incorporated in the heat-plastified polystyrene prior to its extrusion into strands at the die-head at a temperature of 110° C. The resulting strands were immediately led into a water bath maintained at 65° C. After a short residence time therein the strands were led out of the bath to an adjacent conventional strand cutter by which they were cut into particles 0.06 inch long and 0.02 inch in diameter (average dimensions). The particles immediately fell under gravity into a slurry tank maintained at 65° C., from whence a slurry of particles was pumped to the base of a normalizing tower in which normalizing at 65° C. was completed. The period in which the expandable polymer was out of contact with water at 60–80° C., i.e., the time taken for the strand cutting operation, was of the order of 5 seconds. The residence time of the particles in the tower was such that the total normalizing period for the particles was 40 minutes. After normalization the particles were separated from the bulk of the water physically associated therewith and then air-dried.

The resulting expandable polystyrene particles contained on average 5% by weight of pentane and, when subjected to expansion conditions involving contact with live steam at ambient pressure, the particles expanded to form cylindrical beads, the lengths and diameters of which were similar and lay between 0.08 and 0.1 inch; the beads had a cell size between 70 and 100 microns in diameter. The expanded particles were found to be suitable in all respects for the manufacture of shaped articles, e.g., blocks, by conventional steam molding technique.

*Example II*

Expandable polystyrene particles were manufactured by a face-cutting method as described above with reference to FIGURES II and III, the polystyrene being rendered expandable by the incorporation of technical pentane in the manner described in Example I, except that in order to avoid solidification of polymer in the die-head the temperature of the pentane-containing polystyrene at the die-head was 120° C.

A sprinkler was disposed adjacent the front plate for spraying the face of the plate with water droplets at 70° C. during operation of the extruder, the water droplets being formed by the condensation of wet steam. The cutter was rotated at 30 revolutions per minute and the cut particles were carried down by the droplets of the water spray into a body of water, also at 70° C. After a residence time therein of 40 minutes to achieve normalization, the particles were separated from the water and cooled to ambient temperature and simultaneously dried in a current of air.

Using polystyrene and operating at the specified extrusion temperature of 120° C., particles of about 1 millimeter in diameter and containing 5% by weight of pentane were obtained which showed no sign of voids. When subjected to expansion conditions involving contact with live steam at ambient pressure, the particles expanded to form generally spherical beads having a diameter between 3 and 5 millimeters and a cell size ranging from 70 to 100 microns in diameter. The expanded particles were found suitable in all respects for the manufacture of shaped articles by conventional steam molding technique.

*Example III*

Expandable polystyrene particles were manufactured by the face-cutting method, the die-head being a multi-orifice die-head from which 32 strands of pentane-containing polystyrene were extruded simultaneously. The die-head comprised a body of sandwich construction having a face portion against which a bladed cutter, rotated during operation at 30 revolutions per minute, was disposed in such a manner as to cut the extrudate into particles at the die face. The die-head body comprised, in combination, steel front and back plates with an insulating plate of cellulose-filled phenol formaldehyde resin disposed between the front and back plates to provide heat insulation between the front plate, which formed the face portion of the die-head, and the extruder. The back plate, which was mounted on the extruder at its output end, was provided with 32 feed channels, each 1.5 millimeters in diameter. The insulating plate was 1.5 millimeters thick and had 32 feed channels, each 3 millimeters in diameter. The front plate, which was 2.5 millimeters thick, also had 32 feed channels of the same diameter as those in the insulating plate, the feed channels in the front plate and in the insulating plate being in register with one another and with those in the back plate. The die-head also embodied a separate heating plate which comprised a copper plate having 32 feed channels, each 1.5 millimeters in diameter, mounted between the insulating plate and the back plate. The heating plate had a thickness of 6 millimeters and was provided with a spiral milling on its outer face which, when the die-head was assembled and mounted on the extruder, provided a 3 millimeter-square channel through which steam was passed to maintain the heating plate at about 100° C.

The extruder employed comprised a 60 millimeter screw diameter extruder fitted with a screw having a 20:1 length-to-diameter ratio and a compression ratio of 3:1 in the heat-plastifying section, the screw being of a design providing a heat-plastifying section in which rapid compression over an initial, one-diameter length of the screw took place; followed by a five-diameter length dispersion section to which technical pentane was supplied for incorporation in the heat-plastified polystyrene. In operation the screw was rotated at 20 revolutions per minute and the temperature conditions in the extruder were such that the temperature profile thereof increased from 80° C. at the input end to 100° C. at the die-head end, the actual temperature of the pentane-containing heat-plastified polystyrene during extrusion being 110° C.

The face-cutting operation was carried out under a spray of water droplets at 60° C., the cut particles being carried down by the droplets of the water spray into a body of water, also at 60° C. After a residence time therein of 1 hour to achieve normalization the particles were separated from the water and cooled to ambient temperature and simultaneously dried in a current of air. When operating at the specified extrusion temperature of 110° C., particles of about 3 millimeters in diameter and containing 4.8% by weight of pentane were obtained, which showed no sign of voids. On expansion with live steam at ambient pressure such expandable polystyrene particles expanded to form generally spherical beads having a diameter of about 1 centimeter and a cell size ranging from 80 to 100 microns in diameter. Such particles were molded into blocks of cellular polystyrene by conventional steam molding technique and performed satisfactorily in this application.

We claim as our invention:

1. A process for the manufacture of expandable particles of a thermoplastic organic polymer composition which comprises, in sequence, the steps of:
   (a) extruding a heat plastified mass of said polymer composition, containing a vaporizable expanding agent incorporated therein, in filamentary form through a die into an environment at substantially atmospheric pressure to form an unexpanded extrudate,
   (b) immediately cooling the resulting extrudate to a temperature at which it remains in the unexpanded state, but not below 60° C., by contact with a fluid at a temperature between 60 and 80° C.,
   (c) maintaining said extrudate in contact with a fluid at said temperature whereby said extrudate is maintained in unexpanded condition at a temperature not below 60° C. during a normalizing period as hereinafter defined, and
   (d) cooling said extrudate, after said normalizing period, to ambient temperature, and which further comprises the step of cutting said filamentary extrudate into particles at any stage of the process following extrusion, said normalizing period being a sufficient length of time to result in the particles, after being cooled, having the property of being converted by unconfined expansion, resulting from heating under conditions of maximum volume increase of the particles, into expanded particles in which at least 90% of the cells have a cell diameter not greater than 100 microns.

2. A process according to claim 1 in which said polymer composition consists essentially of polystyrene.

3. A process according to claim 2 wherein polystyrene is extruded from a die-head at which the extrudate is face-cut into particles while the face of said die-head is sprayed with droplets of water at 60–80° C., and the resulting particles are then immediately contacted with a body of water at 60–80° C.

4. A process according to claim 2 which comprises immediately contacting the filamentary extrudate with a body of water at a temperature between 60 and 80° C., thereafter cutting the filamentary extrudate into particles and continuing contact of the resulting particles with said fluid at 60–80° C. for said normalizing period.

5. A process according to claim 4 wherein the polymer is extruded into a body of water at 60–80° C. from a die-head located adjacent to but spaced from said body of water, the resulting filamentary extrudate is removed from said body of water and cut into particles, and said particles are then immediately contacted with a body of water at 60–80° C. for said normalizing period.

6. A process according to claim 2 wherein said vaporizable expanding agent consists of alkane molecules of five carbon atoms.

7. A process according to claim 6 wherein the extrusion temperature of said heat-plastified polystyrene is between 130 and 160° C. and the polymer is extruded through orifices not exceeding about 1.0 millimeter in diameter.

8. A process according to claim 2 wherein at least the major part of the normalization of the extruded polystyrene is carried out in a tower containing water maintained at 60 to 80° C., a suspension of polymer particles in water at 60 to 80° C. being supplied continuously to the base of said tower and said particles being moved progressively up said tower for discharge from the top of said tower.

References Cited
UNITED STATES PATENTS 3,121,132    2/1964    Del Bene _____ 264—53

FOREIGN PATENTS 849,935    9/1960    Great Britain.

ALEXANDER H. BRODMERKEL, *Primary Examiner.*

L. GARRETT, *Assistant Examiner.*